United States Patent
Zhang et al.

(10) Patent No.: US 10,688,670 B2
(45) Date of Patent: Jun. 23, 2020

(54) PALM-TYPE MECHANICAL GRIPPER WITH VARIABLE-POSITION AND ROTATABLE FINGERS AND DUAL-DRIVE CRANK-SLIDER PARALLEL MECHANISM

(71) Applicant: Jiangnan University, Wuxi (CN)

(72) Inventors: Jun Zhang, Wuxi (CN); Chenyang Fan, Wuxi (CN); Jian Shen, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 168 days.

(21) Appl. No.: 16/071,910

(22) PCT Filed: Dec. 8, 2017

(86) PCT No.: PCT/CN2017/115205
§ 371 (c)(1),
(2) Date: Jul. 23, 2018

(87) PCT Pub. No.: WO2018/184399
PCT Pub. Date: Oct. 11, 2018

(65) Prior Publication Data
US 2019/0366561 A1   Dec. 5, 2019

(30) Foreign Application Priority Data

Apr. 6, 2017   (CN) .......................... 2017 1 0220457

(51) Int. Cl.
| | | |
|---|---|---|
| *B25J 15/10* | (2006.01) | |
| *B25J 9/10* | (2006.01) | |
| *B25J 9/12* | (2006.01) | |

(52) U.S. Cl.
CPC ............... *B25J 15/10* (2013.01); *B25J 9/102* (2013.01); *B25J 9/106* (2013.01); *B25J 9/126* (2013.01); *B25J 15/103* (2013.01)

(58) Field of Classification Search
CPC ........ B25J 15/10; B25J 15/103; B25J 15/106; B25J 15/0213; B25J 15/022; B25J 9/102; B25J 9/106; B25J 9/123; B25J 9/126
(Continued)

(56) References Cited

U.S. PATENT DOCUMENTS

| | | | | |
|---|---|---|---|---|
| 4,828,276 A | * | 5/1989 | Link ................... | B23B 31/1269 279/110 |
| 5,022,695 A | * | 6/1991 | Ayers .................... | B25J 13/085 294/103.1 |

(Continued)

FOREIGN PATENT DOCUMENTS

| | | |
|---|---|---|
| CN | 201394835 Y | 2/2010 |
| CN | 103317521 A | 9/2013 |

(Continued)

*Primary Examiner* — Dean J Kramer
(74) *Attorney, Agent, or Firm* — Bayramoglu Law Offices LLC

(57) ABSTRACT

A palm-type mechanical gripper with variable-position and rotatable fingers and a dual-drive crank-slider parallel mechanism is provided with a crank-slider mechanism on the left side, which is an active driving structure and is driven by two stepping motors to respectively generate angular displacement of cranks and to change lengths of connecting rods, and a crank-slider mechanism on the right side, which is a driven mechanism and is driven at a constant speed by a pair of gears. The mechanical gripper is provided with three plate spring fingers, wherein two fingers are respectively installed on the connecting rods on left and right sides, and under the cooperative effect of the two stepping motors, the eccentricities of the cranks, the positions and angles of the two fingers respectively on the two connecting rods and the position of the other fixed finger can be changed through manual adjustment.

1 Claim, 7 Drawing Sheets

(58) Field of Classification Search
USPC .................................... 294/103.1, 104, 115
See application file for complete search history.

(56) References Cited

U.S. PATENT DOCUMENTS

| | | | | |
|---|---|---|---|---|
| 5,150,937 A | * | 9/1992 | Yakou | ............... B25J 9/1612 294/119.1 |
| 5,161,846 A | * | 11/1992 | Yakou | ............... B25J 9/1612 294/106 |
| 5,447,403 A | | 9/1995 | Engler | |
| 6,273,483 B1 | * | 8/2001 | Bone | ............... B25J 15/103 294/119.1 |
| 8,390,683 B2 | * | 3/2013 | Tassakos | ............. B07C 5/122 348/92 |

FOREIGN PATENT DOCUMENTS

| | | |
|---|---|---|
| CN | 103386691 A | 11/2013 |
| CN | 204277999 U | 4/2015 |
| CN | 106826798 A | 6/2017 |
| FR | 2537908 A1 * 6/1984 | ............ B25J 15/103 |
| JP | 2009291853 A | 12/2009 |

* cited by examiner

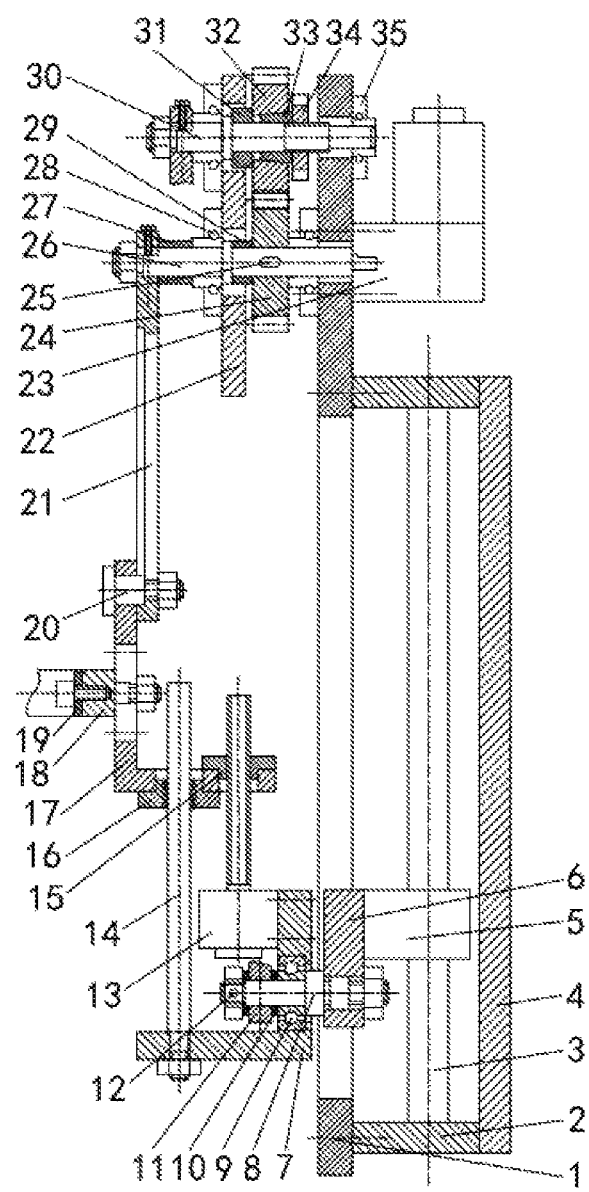
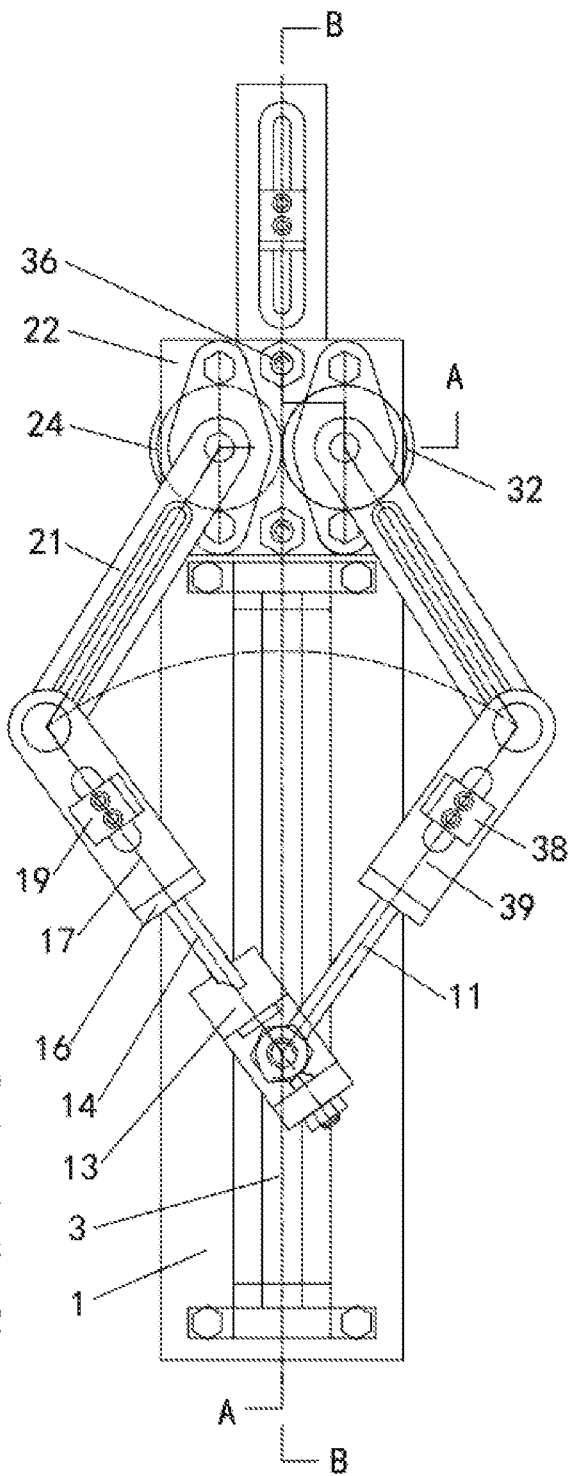
Figure 1
Figure 2

B-B unfolding

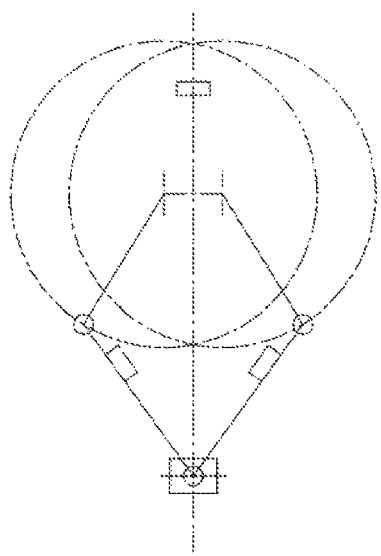
Figure 24
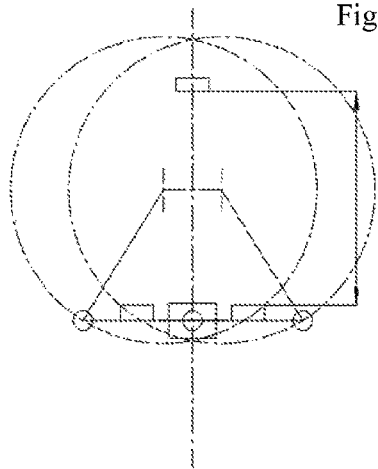 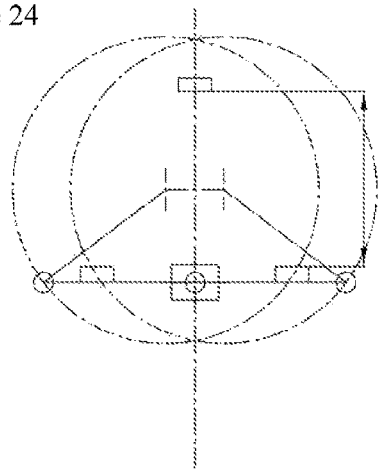
Figure 25 Figure 26
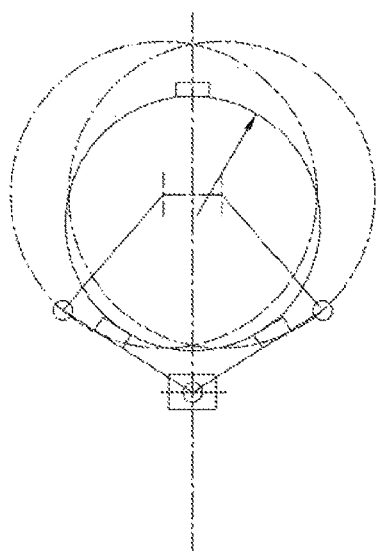 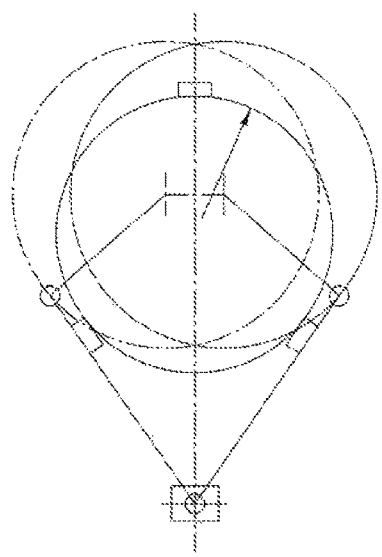
Figure 27 Figure 28

PALM-TYPE MECHANICAL GRIPPER WITH VARIABLE-POSITION AND ROTATABLE FINGERS AND DUAL-DRIVE CRANK-SLIDER PARALLEL MECHANISM

CROSS REFERENCE TO RELATED APPLICATIONS

This application is the national phase entry of International Application PCT/CN2017/115205, filed on Dec. 8, 2017, which is based upon and claims priority to Chinese Patent Application No. CN201710220457.7, filed on Apr. 6, 2017, the entire contents of which are incorporated herein by reference.

TECHNICAL FIELD

A palm-type mechanical gripper with variable-position and rotatable fingers and a dual-drive crank-slider parallel mechanism of the invention is provided with a crank-slider mechanism on the left side and a crank-slider mechanism on the right side, wherein the crank-slider mechanism on the left side is an active driving structure and is driven by two stepping motors to respectively generate angular displacement of cranks and to change lengths of connecting rods, the crank-slider mechanism on the right side is a driven mechanism and is driven at a constant speed by a pair of gears, and the rotational angular displacement of the crank on the left side is equal to that of the crank on the right side. The mechanical gripper is provided with three plate spring fingers, wherein two fingers are respectively installed on the connecting rod on the left side and the connecting rod on the right side, and under the cooperative effect of the two stepping motors, the eccentricities of the cranks, the positions and angles of the two fingers respectively on the two connecting rods and the position of the other fixed finger can be changed through manual adjustment. The mechanical gripper of the invention is driven to generate a clamping and grasping force by the two stepping motors, which can be powered off in the grasping process based on the self-locking property. The mechanical gripper of the invention has the advantages of large operation space, high adaptability, low energy consumption and the like, belonging to the fields of logistics transportation equipment, mechanical grippers and robots.

BACKGROUND

At present, except high-cost human-simulated manipulators provided with a plurality of sensors, common mechanical grippers either can only grasp round or spherical objects with different diameters by controlling center distances of fingers or can only grasp rectangular objects by controlling the fingers to rotate. Mechanical grippers with variable-position and rotatable fingers are not available yet.

SUMMARY

In order to overcome the aforesaid defects, the invention provides a mechanical gripper, which is designed in the aspect of changing the palm shape and adopts the simplest crank-slider mechanisms based on the characteristic of a large acting space of the parallel mechanism. Three identical flexible plate spring fingers are adopted, wherein one finger is fixed, and the other two fingers are capable of both rotating and moving to achieve translational motions instead of being capable of rotating solely or moving solely. The fingers can be pneumatically driven to grasp objects. The mechanical gripper of the invention is driven to generate a clamping and grasping force by two stepping motors, which can be powered off in the grasping process based on the self-locking property.

The technical solution of the present invention is as follows.

As shown in FIGS. 1-23, the invention provides a palm-type mechanical gripper with variable-position and rotatable fingers and a dual-drive crank-slider parallel mechanism, which is composed of a base plate 1, guide rail supports 2, a linear guide rail 3, an installation plate 4, a linear bearing 5, a movable base 6, a rotatable base 7, a hinge shaft 8, a bearing 9, wear washers 10, a rotatable guide rod 11, a cotter pin 12, a lead screw stepping motor 13, a guide column 14, a lead screw nut 15, a flange linear bearing 16, a driving connecting rod 17, a short finger holder 18, plate spring curved fingers 19, a crank-connecting rod pin 20, grooved cranks 21, a gear cover plate 22, a stepping motor with a worm speed reducer 23, a gear 24, a flat key 25, a driving shaft 26, a long sleeve 27, mounted bearings 28, a short sleeve 29, a driven shaft 30, a thick sleeve 31, a taper-hole gear 32, a taper sleeve 33, a flat round nut 34, small mounted bearings 35, guide studs 36, a long finger holder 37, a medium finger holder 38 and a driven connecting rod 39.

As shown in FIGS. 1-3 for the palm-type mechanical gripper with the variable-position and rotatable fingers and the dual-drive crank-slider parallel mechanism of the invention, two ends of the linear guide rail 3 are fixed by the two guide rail supports 2 installed on the base plate 1. Two ends of the installation plate 4 are respectively fixed on the two guide rail supports 2. The installation plate 4 is provided with a series of holes located at different positions and used for connection with a robot body. Sizes of the series of holes correspond to the size of the robot body. The series of holes located at different positions are beneficial to adjustment and connection to adapt to gravity centers of different grasped objects. The linear bearing 5 penetrates through the linear guide rail 3 to move. The movable base 6 is fixed on the linear bearing 5. The hinge shaft 8 is fixed on the movable base 6 with a nut. The bearing 9 is installed on the hinge shaft 8. A shaft shoulder face of the hinge shaft 8 makes contact with an inner ring of the bearing 9. The rotatable base 7 is installed on an outer ring of the bearing 9. An axial gravity generated by a grasped object is transmitted by the rotatable base 7 to the outer ring of the bearing 9. The wear washers 10 are disposed between the rotatable guide rod 11 and the inner ring of the bearing 9 as well as between the nut and the rotatable guide rod 11. The nut is tightened on the hinge shaft 8, so that axial movement of the bearing 9, the wear washers 10 and the rotatable guide rod 11 is limited. A thread length ensures the presence of an axial clearance, so that relative rotation of the bearing 9 and the rotatable guide rod 11 is ensured. After the nut is tightened, the cotter pin 12 is used to prevent the nut from getting loose.

The lead screw stepping motor 13 is used to control lengths of the connecting rods in crank-slider mechanisms and conducts control in cooperation with the stepping motor with the worm speed reducer 23 used to drive the cranks to rotate, so that a dual-drive parallel mechanism is formed. A lead screw nut structure in the lead screw stepping motor 13 and the worm speed reducer of the stepping motor with the worm speed reducer 23 have a self-locking effect so that the lead screw stepping motor 13 and the stepping motor with the worm speed reducer 23 can be powered off in the grasping process to save energy. The stepping motor with the worm speed reducer 23 having a higher power than the lead screw stepping motor 13 is mainly used to drive the clamped object.

The lead screw stepping motor 13 is fixed on the rotatable base 7. The guide column 14 coplanar and parallel with a lead screw of the lead screw stepping motor 13 is fixed on the rotatable base 7 with a nut. The threaded end of the guide column 14 is provided with a section of cylindrical face and is assembled in a corresponding hole in the rotatable base 7 in a small clearance and small interference fit manner. The lead screw nut 15 and the flange linear bearing 16 are correspondingly installed on the vertical face of the L-shaped driving connecting rod 17. A kidney-shaped groove is formed in the horizontal face of the driving connecting rod 17 and has a width in clearance fit with the diameter of a section of cylindrical face at the threaded end of the short finger holder 18. The short finger holder 18 can be located at any position of the kidney-shaped groove of the driving connecting rod 17, can rotate by any angle with respect to the driving connecting rod 17 and is fixed on the driving connecting rod 17 with a nut. One plate spring curved finger 19 is installed on the short finger holder 18 and provided with a fingertip curved part used to grasp the object in a pinching manner and a middle curved part used to grasp the object in a wrapping manner.

Two layers of kidney-shaped grooves with different widths are coaxially milled in each grooved crank 21 and used to adjust the eccentricity of the crank. The cylindrical face of the crank-connecting rod pin 20 is in running clearance fit with a hole in the driving connecting rod 17 and has a diameter in clearance fit with the width of the wide kidney-shaped groove in the corresponding grooved crank 21. The corresponding narrow kidney-shaped groove has a width slightly greater than the thread diameter of the crank-connecting rod pin 20. The shaft shoulder face of a thread root part of the crank-connecting rod pin 20 and a step face between the corresponding wide and narrow kidney-shaped grooves are tightly pressed together by fastening a nut. An axis clearance for the driving connecting rod 17 to rotate in the crank-connecting rod pin 20 is ensured.

The other end of the driving grooved crank 21 is sleeved with the driving shaft 26, fastened on the flat face at one end of the driving shaft 26 with a screw and used to transmit rotation torque of the driving shaft 26. The grooved cranks 21, the long sleeve 27, the two mounted bearings 28, the short sleeve 29 and the gear 24 are installed on the driving shaft 26. A flat cylindrical section at the other end of the driving shaft 26 is inserted into a hole of a driving shaft of the stepping motor with the worm speed reducer 23 in a clearance fit manner. The stepping motor with the worm speed reducer 23 transmits the torque to the driving shaft 26 through the flat cylindrical section, and then the torque is transmitted by the flat key 25 on the driving shaft 26 transmits to the gear 24. The axial position of the gear 24 can be adjusted by regulating axis sizes of the long sleeve 27 and the short sleeve 29. One mounted bearing 28 is fixed on the gear cover plate 22, and the axial gravity generated by the grasped object is transmitted by the shaft shoulder face of the driving shaft 26 to an inner ring of the mounted bearing 28 on the gear cover plate 22 so as to be borne by the inner ring. The other mounted bearing 28, which is coaxial with the mounted bearing 28 on the gear cover plate 22, is fixed on the base plate 1. The gear cover plate 22 and the base plate 1 are connected into an integrated structure through the two guide studs 36. The two ends of each guide stud 36 are provided with cylindrical faces in clearance fit with corresponding holes, and are then fastened with nuts, instead of the guide studs 36 directly having thread connection with the base plate 1 and the gear cover plate 22.

The driven shaft 30 is supported by the mounted bearings 28 and the small mounted bearings 35. The mounted bearings 28 and the small mounted bearings 35 are respectively fixed on the gear cover plate 22 and the base plate 1. In the axial direction, the shaft shoulder face of the driven shaft 30, the thick sleeve 31, the taper-hole gear 32, the taper sleeve 33 and the flat round nut 34 form a rotating body. The gear 24 is engaged with the taper-hole gear 32. The taper sleeve 33 is disposed in a hole of the taper-hole gear 32. By tightening the flat round nut 34, the torque is transmitted to the driven shaft 30 under the wedge effect of a conical contact face. The other end of the driven grooved crank 21 is sleeved with the driven shaft 30 and fastened on the flat face at one end of the driven shaft 30 with a screw. The rotation torque of the driven shaft 30 is then transmitted to the driven grooved crank 21. The taper-hole gear 32 and the taper sleeve 33 are separated by reversely unscrewing the flat round nut 34, and then the phase angle between the driving grooved crank 21 and the driven grooved crank 21 is adjusted, namely, the driving grooved crank 21 and the driven grooved crank 21 may be symmetrical or asymmetrical in the horizontal direction.

As shown in FIGS. 2 and 3, the palm-type mechanical gripper with the variable-position and rotatable fingers and the dual-drive crank-slider parallel mechanism is provided with a driving crank-slider mechanism on a left side and a driven crank-slider mechanism on a right side, wherein the rotatable guide rod 11 is located on the right side and is, together with the driven connecting rod 39 on the right side, equivalent to a variable-length connecting rod of the driven crank-slider mechanism; and simultaneous power transmission of the driving grooved crank 21 and the driven grooved crank 21 ensures that under the guidance of the flange linear bearing 16 of the driven connecting rod 39 on the right side, the rotatable guide rod 11 is capable of both rotating and moving without getting stuck.

The long finger holder 37 has a width in clearance fit with the width of a wide kidney-shaped groove in the base plate 1, and a threaded section of the long finger holder 37 penetrates through a narrow kidney-shaped groove in the base plate 1 and is fixed with a nut so that the position of the long finger holder 37 can be adjusted in the kidney-shaped grooves in the base plate 1. The long finger holder 37 is also provided with one plate spring curved finger 19. A kidney-shaped groove is formed in the horizontal face of the driving connecting rod 17 on the right side and has a width in clearance fit with the diameter of a section of cylindrical face at the threaded end of the medium finger holder 38. The medium finger holder 38 can be located at any position of the kidney-shaped groove in the driving connecting rod 17 on the right side, can rotate by any angle with respect to the driving connecting rod 17 and is fixed on the driving connecting rod 17 with a nut. The medium finger holder 38 is also provided with one plate spring curved finger 19. The three plate spring curved fingers 19 are completely identical in structure and size. The structure of the palm-type mechanical gripper with the variable-position and rotatable fingers and the dual-drive crank-slider parallel mechanism needs to ensure that the planes, where the plate spring curved fingers 19 are installed, of the short finger holder 18, the medium finger holder 38 and the long finger holder 37 are coplanar.

① Shape adaptability: based on cooperative driving by the two stepping motors, the mechanical gripper has good shape adaptability to rectangular shape, round shape, elliptic shape, trapezoidal shape and the like.

②Size adaptability: the mechanical gripper is provided with three fingers, the eccentricities of the cranks, the positions and angles of the two fingers respectively on the two connecting rods and the position of the other fixed finger can be changed through manual adjustment, and thus, the mechanical gripper has good size adaptability.

③Operation flexibility: when three fingers are used to grasp an object, the line of symmetry of the contact face of the fixed finger is the positioning coordinate origin of the mechanical gripper; and when two movable fingers are used to grasp an object after being manually rotated, the line of symmetry of the two contact faces is the positioning coordinate origin of the mechanical gripper.

④Grasping agility: the stepping motor for driving the connecting rods is mainly used for positioning, the stepping motor for driving the cranks is mainly used for grasping, and thus, the cranks can annularly rotate rapidly.

⑤Energy saving in service: during rotation of the cranks, the speed reducer of the worm-gear mechanism is used for self-locking, during length-adjusting movement of the connecting rods, the lead screw nut mechanism is used for self-locking, and thus, the two driving stepping motors can be powered off in the grasping process.

BRIEF DESCRIPTION OF THE DRAWINGS

FIG. 1 is an A-A section unfolded view of a palm-type mechanical gripper with a parallel mechanism of the invention.

FIG. 2 is a front view of the palm-type mechanical gripper with a parallel mechanism of the invention.

FIG. 24 is a simplified structural schematic diagram of the palm-type mechanical gripper with a parallel mechanism of the invention.

FIG. 25 is a simplified schematic diagram of the palm-type mechanical gripper with a parallel mechanism in the status of grasping a large rectangular object by three fingers of the invention.

FIG. 26 is a simplified schematic diagram of the palm-type mechanical gripper with a parallel mechanism in the status of grasping a small rectangular object by three fingers of the invention.

FIG. 27 is a simplified schematic diagram of the palm-type mechanical gripper with a parallel mechanism in the status of grasping a small round object by three fingers of the invention.

FIG. 28 is a simplified schematic diagram of the palm-type mechanical gripper with a parallel mechanism in the status of grasping a large round object by three fingers of the invention.

In the figures: 1, base plate; 2, guide rail support; 3, linear guide rail; 4, installation plate; 5, linear bearing; 6, movable base; 7, rotatable base; 8, hinge shaft; 9, bearing; 10, wear washer; 11, rotatable guide rod; 12, cotter pin; 13, lead screw stepping motor; 14, guide column; 15, lead screw nut; 16, flange linear bearing; 17, driving connecting rod; 18, short finger holder; 19, plate spring curved finger; 20, crank-connecting rod pin; 21, grooved crank; 22, gear cover plate; 23, stepping motor with worm speed reducer; 24, gear; 25, flat key; 26, driving shaft; 27, long sleeve; 28, mounted bearing; 29, short sleeve; 30, driven shaft; 31, thick sleeve; 32, taper-hole gear; 33, taper sleeve; 34, flat round nut; 35, small mounted bearing; 36, guide stud;

37, long finger holder; 38, medium finger holder; 39, driven connecting rod.

DETAILED DESCRIPTION

FIG. 24 shows a simplified structural schematic diagram of the palm-type mechanical gripper with a parallel mechanism of the invention. As shown in FIG. 24, in the implementation process of the palm-type mechanical gripper with variable-position and rotatable fingers and a dual-drive crank-slider parallel mechanism, on the one hand, the lead screw stepping motor 13 and the stepping motor with the worm speed reducer 23 conduct control cooperatively for grasping objects; and on the other hand, total five manual adjustment approaches can be adopted to change (1) the eccentricities of the cranks, (2) the degree of asymmetry of the left crank and the right crank with respect to the axis of the linear guide rail 3, (3) the positions of the two fingers of the cranks respectively on the two connecting rods, (4) the angles of the two fingers respectively on the two connecting rods, and (5) the position of the other fixed finger, wherein the five approaches can be adopted independently or in any combination to change the aforesaid parameters, thus, forming specific embodiments. A part of these embodiments is illustrated as follows.

Figure 3:
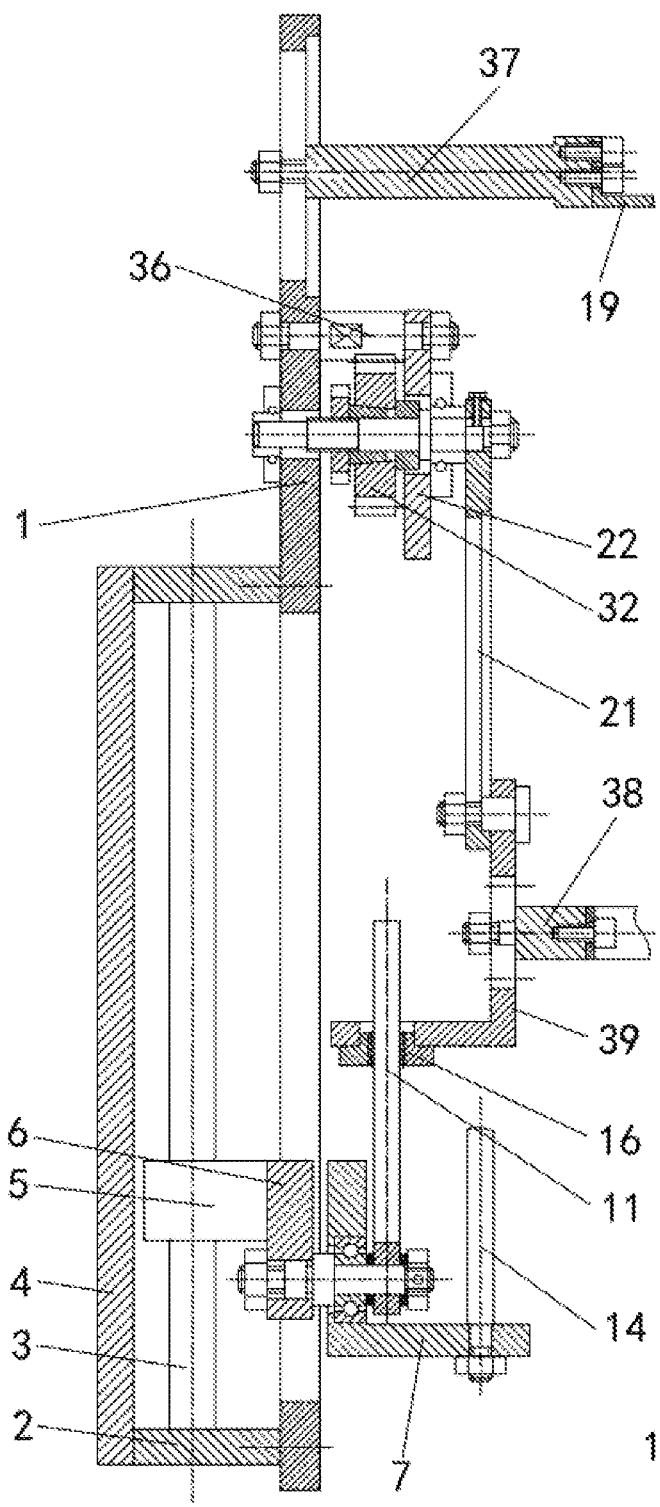
FIG. 3 is a B-B section unfolded view of the palm-type mechanical gripper with a parallel mechanism of the invention.
Figure 4:
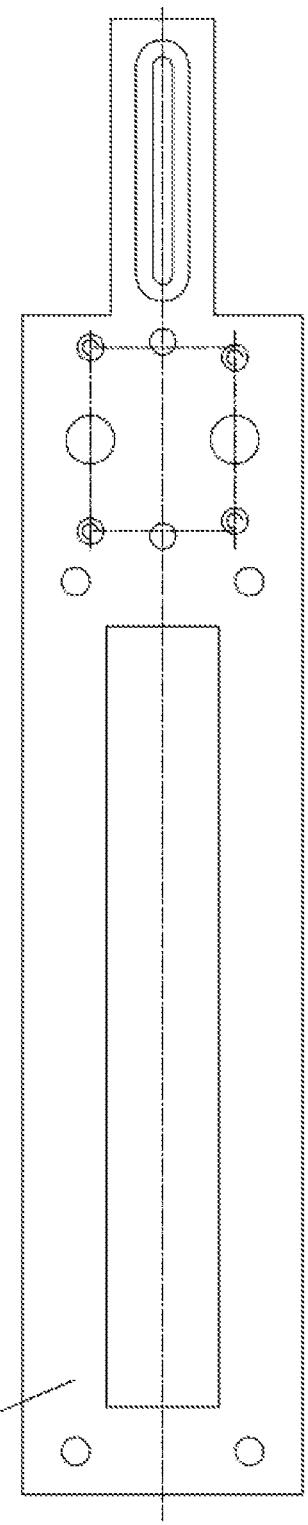
FIG. 4 is a front view of a base plate of the palm-type mechanical gripper with a parallel mechanism of the invention.
Figure 5:
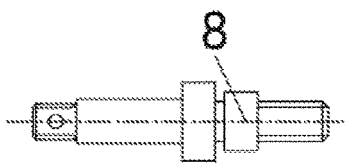
FIG. 5 is a front view of a hinge shaft of the palm-type mechanical gripper with a parallel mechanism of the invention.
Figure 6:
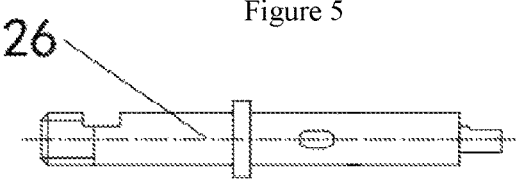
FIG. 6 is a front view of a driving shaft of the palm-type mechanical gripper with a parallel mechanism of the invention.
Figure 7:
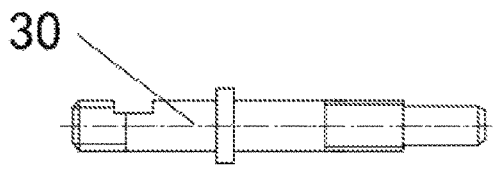
FIG. 7 is a front view of a driven shaft of the palm-type mechanical gripper with a parallel mechanism of the invention.
Figure 8:
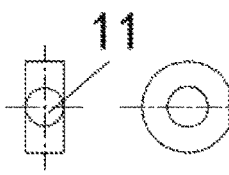
FIG. 8 is a right view of a rotatable guide rod of the palm-type mechanical gripper with a parallel mechanism of the invention.
Figure 9:
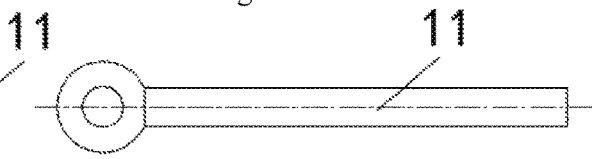
FIG. 9 is a front view of the rotatable guide rod of the palm-type mechanical gripper with a parallel mechanism of the invention.
Figure 10:
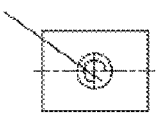
FIG. 10 is a right view of a short finger holder of the palm-type mechanical gripper with a parallel mechanism of the invention.
Figure 11:
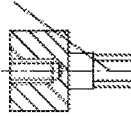
FIG. 11 is a front view of the short finger holder of the palm-type mechanical gripper with a parallel mechanism of the invention.
Figure 12:
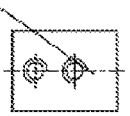
FIG. 12 is a left view of the short finger holder of the palm-type mechanical gripper with a parallel mechanism of the invention.
Figure 13:
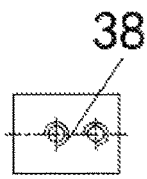
FIG. 13 is a right view of a medium finger holder of the palm-type mechanical gripper with a parallel mechanism of the invention.
Figure 14:
FIG. 14 is a front view of the medium finger holder of the palm-type mechanical gripper with a parallel mechanism of the invention.
Figure 15:
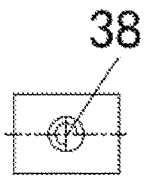
FIG. 15 is a left view of the medium finger holder of the palm-type mechanical gripper with a parallel mechanism of the invention.
Figures 16, 17, 18:
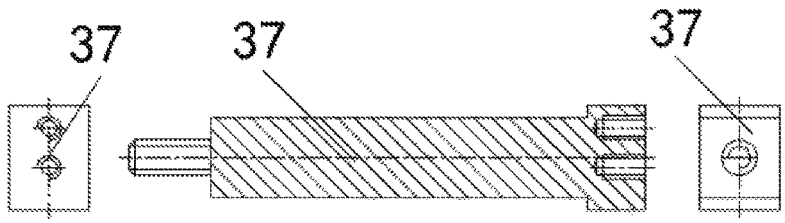
FIG. 16 is a right view of a long finger holder of the palm-type mechanical gripper with a parallel mechanism of the invention.
FIG. 17 is a front view of the long finger holder of the palm-type mechanical gripper with a parallel mechanism of the invention.
FIG. 18 is a left view of the long finger holder of the palm-type mechanical gripper with a parallel mechanism of the invention.
Figure 19:
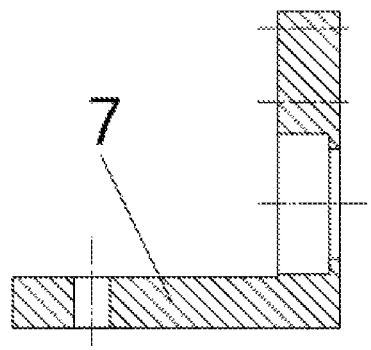
FIG. 19 is a front view of a rotatable base of the palm-type mechanical gripper with a parallel mechanism of the invention.
Figure 20:
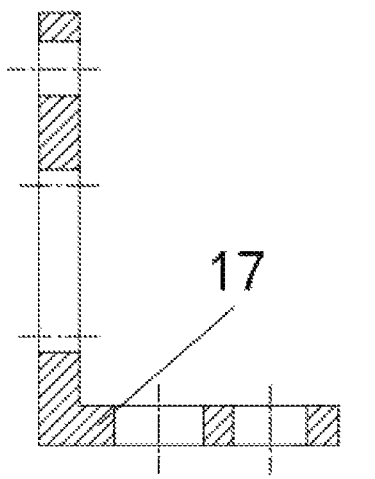
FIG. 20 is a front view of a driving connecting rod of the palm-type mechanical gripper with a parallel mechanism of the invention.
Figure 21:
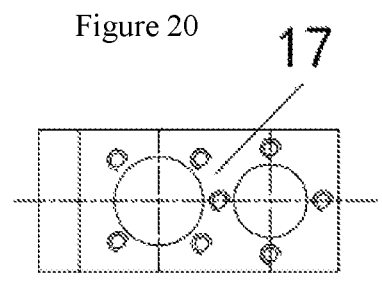
FIG. 21 is a top view of the driving connecting rod of the palm-type mechanical gripper with a parallel mechanism of the invention.
Figures 22, 23:
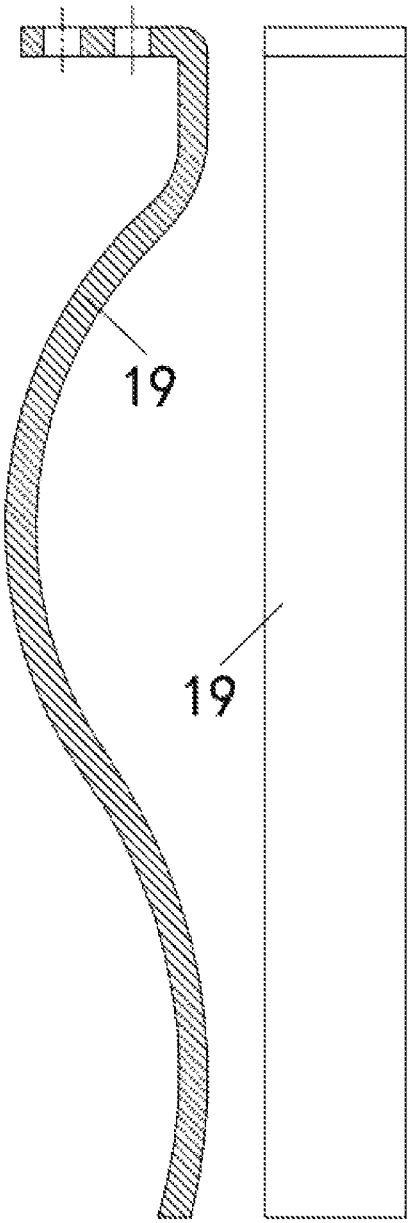
FIG. 22 is a front view of a plate spring curved finger of the palm-type mechanical gripper with a parallel mechanism of the invention.
FIG. 23 is a left view of the plate spring curved finger of the palm-type mechanical gripper with a parallel mechanism of the invention.
Figure 29:
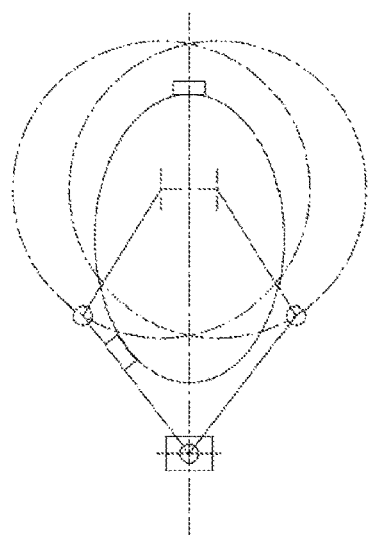
FIG. 29 is a simplified schematic diagram of the palm-type mechanical gripper with a parallel mechanism in the status of grasping an elliptic object with a large length-diameter ratio by three fingers of the invention.
Figure 30:
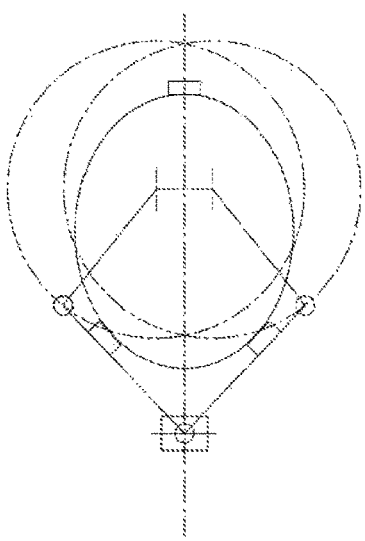
FIG. 30 is a simplified schematic diagram of the palm-type mechanical gripper with a parallel mechanism in the status of grasping an elliptic object with a small length-diameter ratio by three fingers of the invention.

Embodiment 1 can be realized only through cooperative control of the two stepping motors without adopting any of the five manual adjustment approaches. FIG. 25 shows a grasping effect of the palm-type mechanical gripper with a parallel mechanism in the status of grasping a large rectangular object by three fingers of the invention. FIG. 26 shows a grasping effect of the palm-type mechanical gripper with a parallel mechanism in the status of grasping a small rectangular object by three fingers of the invention. FIG. 27 shows a grasping effect of the palm-type mechanical gripper with a parallel mechanism in the status of grasping a small round object by three fingers of the invention. FIG. 28 shows a grasping effect of the palm-type mechanical gripper with a parallel mechanism in the status of grasping a large round object by three fingers of the invention. FIG. 29 shows a grasping effect of the palm-type mechanical gripper with a parallel mechanism in the status of grasping an elliptic object with a large length-diameter ratio by three fingers of the invention. FIG. 30 shows a grasping effect of the palm-type mechanical gripper with a parallel mechanism in the status of grasping an elliptic object with a small length-diameter ratio by three fingers of the invention.

Figure 31:
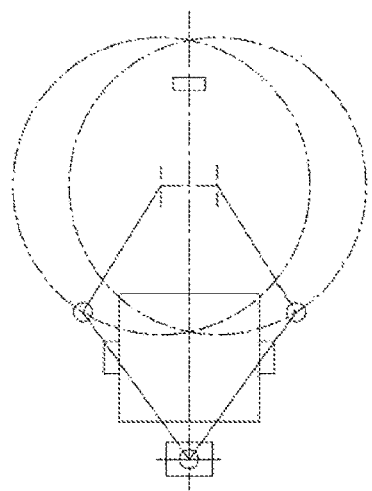
FIG. 31 is a simplified schematic diagram of the palm-type mechanical gripper with a parallel mechanism in the status of grasping a large rectangular object by two fingers of the invention.
Figure 32:
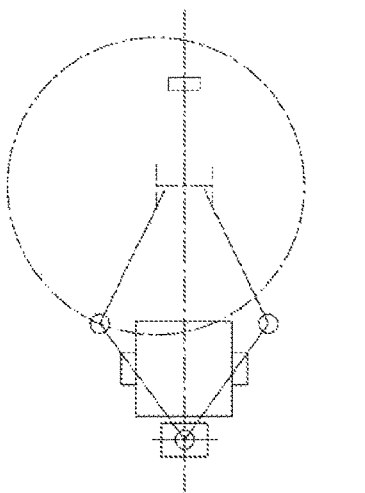
FIG. 32 is a simplified schematic diagram of the palm-type mechanical gripper with a parallel mechanism in the status of grasping a small rectangular object by two fingers of the invention.

Embodiment 2: manual adjustment is adopted, specifically, the short finger holder 18 and the medium finger holder 38 respectively located on the left connecting rod and the right connecting rod are oppositely rotated by a same angle. FIG. 31 shows a grasping effect of two fingers for grasping a large rectangular object of the palm-type mechanical gripper with a parallel mechanism of the invention. FIG. 32 shows a grasping effect of two fingers for grasping a small rectangular object of the palm-type mechanical gripper with a parallel mechanism of the invention.

Figure 33:
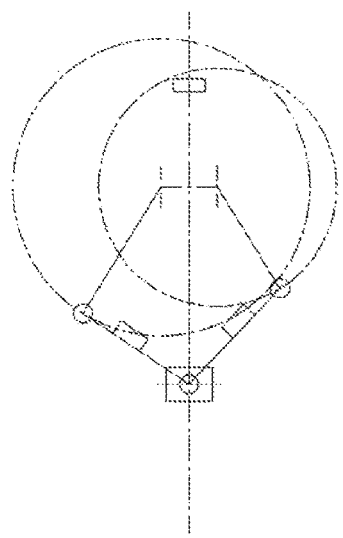
FIG. 33 is a simplified schematic diagram of cranks with unequal eccentricities of the palm-type mechanical gripper with a parallel mechanism of the invention.

Embodiment 3: manual adjustment is adopted, specifically, the two cranks have different eccentricities, as shown in FIG. 33 which is a simplified schematic diagram of the cranks with unequal eccentricities of the palm-type mechanical gripper with a parallel mechanism of the invention. In this embodiment, the mechanical gripper can grasp asymmetrical objects.

Figure 34:
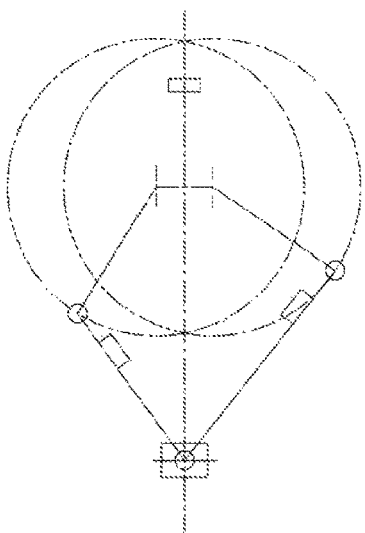
FIG. 34 is a simplified schematic diagram of asymmetrical cranks of the palm-type mechanical gripper with a parallel mechanism of the invention.
Figure 35:
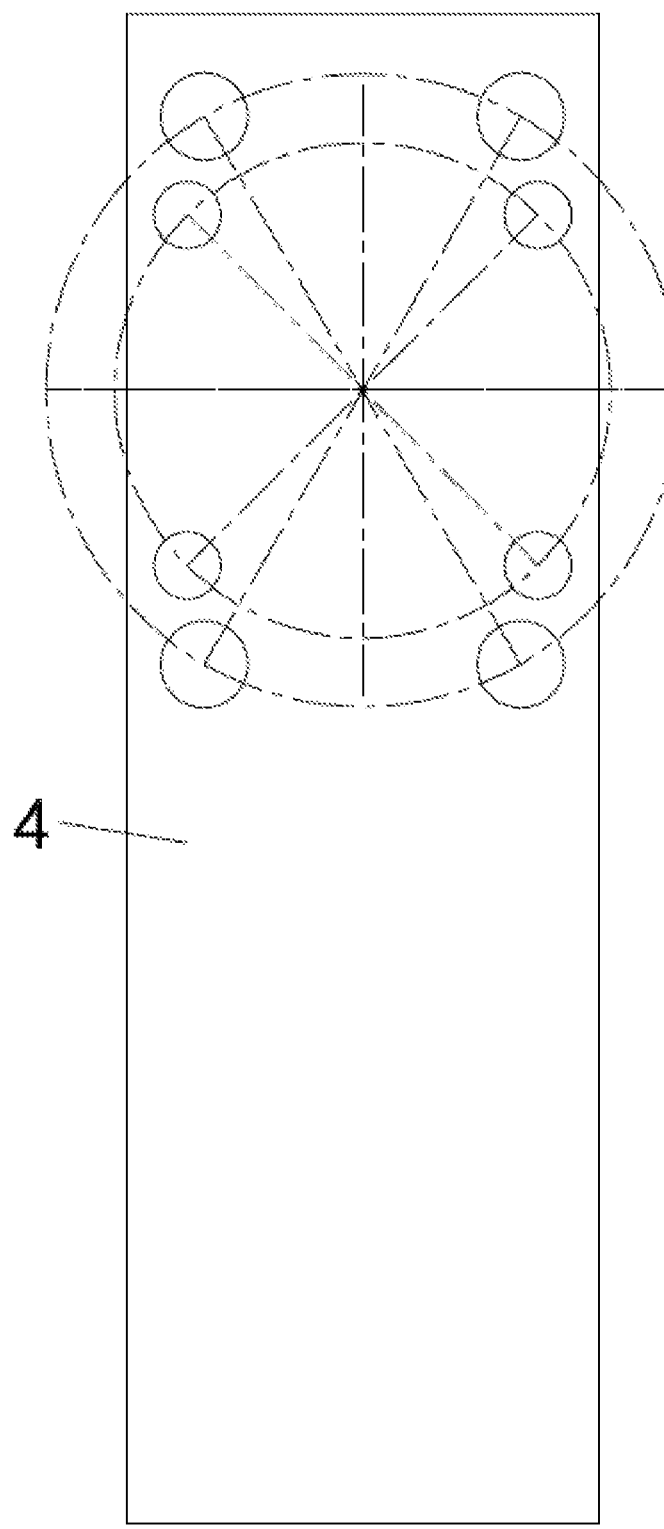
FIG. 35 is a front view of the installation plate with a series of holes located at different positions.

Embodiment 4: manual adjustment is adopted, specifically, the two cranks are asymmetrical with respect to the axis of the linear guide rail 3, as shown in FIG. 34 which is a simplified schematic diagram of the asymmetrical cranks of the palm-type mechanical gripper with a parallel mechanism of the invention. In this embodiment, the mechanical gripper can grasp irregular objects.

The above description is used for explaining the invention instead of being used for limiting the invention. The scope defined by the invention depends on the claims. It would appreciate that all other improvements and changes directly educed or worked out by those skilled in this field without deviating from the basic concept of the invention should fall within the protection scope of the invention.

What is claimed is:

1. A palm-type mechanical gripper with variable-position and rotatable fingers and a dual-drive crank-slider parallel mechanism, wherein two ends of a linear guide rail are fixed by two guide rail supports installed on a base plate, two ends of an installation plate are respectively fixed on the two guide rail supports, the installation plate is provided with a series of holes located at different positions and used for connection with a robot body, sizes of the series of holes correspond to a size of the robot body, and the series of holes located at different positions are beneficial to adjustment and connection so as to adapt to gravity centers of different grasped objects;

a linear bearing penetrates through the linear guide rail to move, a movable base is fixed on the linear bearing, a hinge shaft is fixed on the movable base with a first nut, a bearing is installed on the hinge shaft, a shaft shoulder face of the hinge shaft contacts with an inner ring of the bearing, a rotatable base is installed on an outer ring of the bearing, and an axial gravity generated by a grasped object is transmitted by the rotatable base to the outer ring of the bearing;

a first wear washer is disposed between a rotatable guide rod and the bearing, a second wear washer is disposed between the first nut and the rotatable guide rod;

the first nut is tightened on the hinge shaft, so that an axial movement of the bearing, the first and second wear washers, and the rotatable guide rod is limited;

a thread length ensures the presence of an axial clearance, so that a relative rotation of the bearing and the rotatable guide rod is ensured;

a cotter pin is provided to prevent the first nut from getting loose after the first nut is tightened;

a lead screw stepping motor in a crank-slider mechanism conducts control in cooperation with a stepping motor with a worm speed reducer used to drive a crank to rotate, so that a dual-drive parallel mechanism is formed;

a lead screw nut structure of the lead screw stepping motor and the worm speed reducer of the stepping motor with the worm speed reducer have a self-locking effect so that the lead screw stepping motor and the stepping motor with the worm speed reducer are powered off in a grasping process to save energy;

the stepping motor with the worm speed reducer having a higher power than the lead screw stepping motor is used as a drive power for grasping objects;

the lead screw stepping motor is fixed on the rotatable base, a guide column coplanar and parallel with a lead screw of the lead screw stepping motor is fixed on the rotatable base with a second nut, a threaded end of the guide column is provided with a section of cylindrical face and is assembled in a corresponding hole in the rotatable base in a small clearance and small interference fit manner;

a lead screw nut and a flange linear bearing are correspondingly installed on a vertical face of an L-shaped driving connecting rod, a kidney-shaped groove is formed in a horizontal face of the driving connecting rod and has a width in clearance fit with a diameter of a section of cylindrical face at a threaded end of a short finger holder, the short finger holder is located at a position of the kidney-shaped groove of the driving connecting rod, capable of rotating by an angle with respect to the driving connecting rod and fixed on the driving connecting rod with a third nut, a first plate spring curved finger is installed on the short finger holder and provided with a fingertip curved part used to grasp an object in a pinching manner, and a middle curved part is used to grasp the object in a wrapping manner;

two layers of kidney-shaped grooves with different widths are coaxially milled in each of a plurality of grooved cranks and used to adjust an eccentricity of the crank, a cylindrical face of a crank-connecting rod pin is in running clearance fit with a hole in the driving connecting rod and has a diameter in clearance fit with a width of a wide kidney-shaped groove in the corresponding grooved crank, a corresponding narrow kidney-shaped groove has a width slightly greater than a thread diameter of the crank-connecting rod pin, a shaft shoulder face of a thread root part of the crank-connecting rod pin and a step face between the corresponding wide and narrow kidney-shaped grooves are tightly pressed together by fastening a fourth nut, and an axis clearance for the driving connecting rod to rotate in the crank-connecting rod pin is ensured;

one end of a driving grooved crank is sleeved with a driving shaft, fastened on a flat face at one end of the driving shaft with a screw and used to transmit rotation torque of the driving shaft;

the grooved crank, a long sleeve, two mounted bearings, a short sleeve and a gear are installed on the driving shaft, a flat cylindrical section at an end of the driving shaft is inserted into a hole of a driving shaft of the stepping motor with the worm speed reducer in a clearance fit manner, the stepping motor with the worm speed reducer transmits torque to the driving shaft through the flat cylindrical section, and a flat key on the driving shaft transmits the torque to the gear;

an axial position of the gear is adjusted by regulating axis sizes of the long sleeve and the short sleeve;

a first mounted bearing is fixed on a gear cover plate, and the axial gravity generated by the grasped object is transmitted by a shaft shoulder face of the driving shaft to an inner ring of the first mounted bearing on the gear cover plate so as to be borne by the inner ring;

a second mounted bearing coaxial with the first mounted bearing on the gear cover plate is fixed on the base plate;

the gear cover plate and the base plate are connected into an integrated structure through two guide studs, two ends of each guide stud are provided with cylindrical faces in clearance fit with corresponding holes, and are then fastened with nuts, instead of the guide studs directly having a thread connection with the base plate and the gear cover plate;

a driven shaft is supported by the two mounted bearings and a small mounted bearings, the two mounted bearings and the small mounted bearing are respectively fixed on the gear cover plate and the base plate;

in an axial direction, a shaft shoulder face of the driven shaft, a thick sleeve, a taper-hole gear, a taper sleeve and a flat round nut form a rotating body;

the gear is engaged with the taper-hole gear, the taper sleeve is disposed in a hole of the taper-hole gear, and by tightening the flat round nut, the torque is transmitted to the driven shaft under a wedge effect of a conical contact face;

an end of a driven grooved crank is sleeved with the driven shaft and fastened on a flat face at one end of the driven shaft with a screw, and rotation torque of the driven shaft is then transmitted to the driven grooved crank;

the taper-hole gear and the taper sleeve are configured to be separated by reversely unscrewing the flat round nut, and then a phase angle between the driving grooved crank and the driven grooved crank is adjusted, the driving grooved crank and the driven grooved crank are symmetrical or asymmetrical in a horizontal direction;

the palm-type mechanical gripper with the variable-position and rotatable fingers and the dual-drive crank-slider parallel mechanism is provided with a driving crank-slider mechanism on a left side and a driven crank-slider mechanism on a right side, wherein the rotatable guide rod is located on the right side and is, together with a driven connecting rod on the right side, equivalent to a variable-length connecting rod of the driven crank-slider mechanism;

a simultaneous power transmission of the driving grooved crank and the driven grooved crank ensures that under a guidance of the flange linear bearing of the driven connecting rod on the right side, the rotatable guide rod is capable of both rotating and moving without getting stuck;

a long finger holder has a width in clearance fit with a width of a wide kidney-shaped groove in the base plate, and a threaded section of the long finger holder penetrates through a narrow kidney-shaped groove in the base plate and is fixed with a fifth nut so that a position of the long finger holder can be adjusted in the wide and narrow kidney-shaped grooves in the base plate, and a second plate spring curved finger is installed on the long finger holder;

a kidney-shaped groove is formed in a horizontal face of the driving connecting rod on the right side and has a width in clearance fit with a diameter of a section of cylindrical face at a threaded end of a medium finger holder;

the medium finger holder is located at a position of the kidney-shaped groove in the driven connecting rod on the right side, capable of rotating by an angle with respect to the driven connecting rod, and fixed on the driven connecting rod with a sixth nut, and a third plate spring curved finger is installed on the medium finger holder; and the first, second, and third plate spring curved fingers are completely identical in structure and size, planes of the short finger holder, the medium finger holder and the long finger holder are coplanar, and the three plate spring curved fingers are installed on the planes.

* * * * *